United States Patent
Lee et al.

(10) Patent No.: US 10,437,276 B2
(45) Date of Patent: Oct. 8, 2019

(54) HEAT DISSIPATION CIRCUIT AND REGULATOR CONTROL CIRCUIT INCLUDING THE SAME

(71) Applicant: SILICON WORKS CO., LTD., Daejeon-si (KR)

(72) Inventors: Ju Hyun Lee, Daejeon-si (KR); Kyu Ho Kim, Cheongju-si (KR); Chun Sik Jung, Seoul (KR); Sung Gon Kim, Daejeon-si (KR)

(73) Assignee: SILICON WORKS CO., LTD. (KR)

( * ) Notice: Subject to any disclaimer, the term of this patent is extended or adjusted under 35 U.S.C. 154(b) by 0 days.

(21) Appl. No.: 15/866,672

(22) Filed: Jan. 10, 2018

(65) Prior Publication Data

US 2018/0203479 A1    Jul. 19, 2018

(30) Foreign Application Priority Data

Jan. 16, 2017   (KR) .................. 10-2017-0007181

(51) Int. Cl.
| G05F 1/10 | (2006.01) |
| G05F 1/567 | (2006.01) |
| G05F 5/00 | (2006.01) |
| H02H 3/08 | (2006.01) |
| H02H 3/20 | (2006.01) |
| H02P 9/30 | (2006.01) |
| H02H 9/04 | (2006.01) |

(52) U.S. Cl.
CPC .................. *G05F 5/00* (2013.01); *G05F 1/10* (2013.01); *H02H 3/20* (2013.01); *H02H 9/045* (2013.01); *H02P 9/305* (2013.01)

(58) Field of Classification Search
CPC ......... H02M 3/156; H02H 9/04; H02H 3/081; H02H 3/08; H02H 3/085; H02H 3/20; G05F 1/10; G05F 5/00
See application file for complete search history.

(56) References Cited

U.S. PATENT DOCUMENTS

| 4,544,876 A * | 10/1985 | Bailey ...................... H02J 7/35 |
| | | 136/293 |
| 5,001,415 A * | 3/1991 | Watkinson ................ G05F 1/67 |
| | | 136/293 |
| 5,428,682 A * | 6/1995 | Apfel .................. H04M 19/005 |
| | | 379/413 |
| 6,249,109 B1 * | 6/2001 | Kuiri ...................... G05F 1/565 |
| | | 323/265 |
| 6,300,750 B1 * | 10/2001 | Oglesbee ................ G05F 1/565 |
| | | 323/282 |

(Continued)

FOREIGN PATENT DOCUMENTS

| KR | 10-2008-0110309 | 12/2008 |
| KR | 10-1558063 | 10/2015 |

(Continued)

*Primary Examiner* — Gary L Laxton
*Assistant Examiner* — Sisay G Tiku
(74) *Attorney, Agent, or Firm* — Polsinelli PC

(57) ABSTRACT

A regulator control circuit includes a regulator configured to provide an output voltage by regulation using one of an input voltage and a dropped input voltage, to a load; and a heat dissipation circuit configured to sense a change in the input voltage, and provide the dropped input voltage to the regulator when the input voltage is sensed to be equal to or higher than a preset level.

11 Claims, 3 Drawing Sheets

(56) References Cited

U.S. PATENT DOCUMENTS

| | | | | |
|---|---|---|---|---|
| 6,346,796 B1* | 2/2002 | Takeda | ............... | H01H 37/5436 |
| | | | | 320/154 |
| 2008/0001591 A1* | 1/2008 | Yang | ........................ | G05F 1/46 |
| | | | | 323/299 |
| 2015/0015224 A1* | 1/2015 | Yasusaka | ................ | G05F 1/575 |
| | | | | 323/280 |
| 2018/0019598 A1* | 1/2018 | Tsuchiya | ................. | H02J 7/007 |

FOREIGN PATENT DOCUMENTS

| | | |
|---|---|---|
| KR | 10-2016-0140365 | 12/2016 |
| KR | 10-2017-0040731 | 4/2017 |

* cited by examiner

HEAT DISSIPATION CIRCUIT AND REGULATOR CONTROL CIRCUIT INCLUDING THE SAME

BACKGROUND

1. Technical Field

The present disclosure relates to a heat dissipation circuit, and more particularly, to a technology for reducing the heat generation of a regulator.

2. Related Art

In general, a regulator regulates a current to provide a stable output voltage to a load such as a lighting device. Such a regulator performs regulation by dropping an input voltage through an internal resistor. If the input voltage increases, a problem may be caused in that power consumption increases and heat generation becomes serious.

Therefore, a circuit for dissipating the heat generated inside the regulator is demanded in the art.

SUMMARY

Various embodiments are directed to a heat dissipation circuit and a regular control circuit including the same, capable of dissipating the heat of a regulator and thereby reducing internal heat generation.

In an embodiment, a regulator control circuit may include: a regulator configured to provide an output voltage by regulation using one of an input voltage and a dropped input voltage, to a load; and a heat dissipation circuit configured to sense a change in the input voltage, and provide the dropped input voltage to the regulator when the input voltage is sensed to be equal to or higher than a preset level.

In an embodiment, a heat dissipation circuit may include: a switch configured to transfer an input voltage to a regulator; a resistor configured to transfer a dropped input voltage to the regulator; and a controller configured to sense a change in the input voltage, and control the switch when the input voltage is sensed to be equal to or higher than a preset level such that the dropped input voltage is transferred to the regulator by the resistor.

In an embodiment, a regulator control circuit may include: a first input terminal configured to receive an input voltage; a second input terminal configured to receive a dropped input voltage; a controller configured to sense a level of the input voltage, and control the input voltage or the dropped input voltage to be transferred to the first input terminal or the second input terminal depending on the level of the input voltage; and a regulator configured to perform regulation by using the input voltage or the dropped input voltage transferred through the first or second input terminal, and provide an output voltage by the regulation to a load.

According to the embodiments of the present disclosure, since a dropped input voltage is provided to a regulator through a resistor disposed outside a chip when an input voltage is sensed to be equal to or higher than a preset level, heat may be dissipated through the resistor disposed outside the chip, whereby it is possible to reduce the internal heat generation of the regulator.

DETAILED DESCRIPTION

Figure 1:
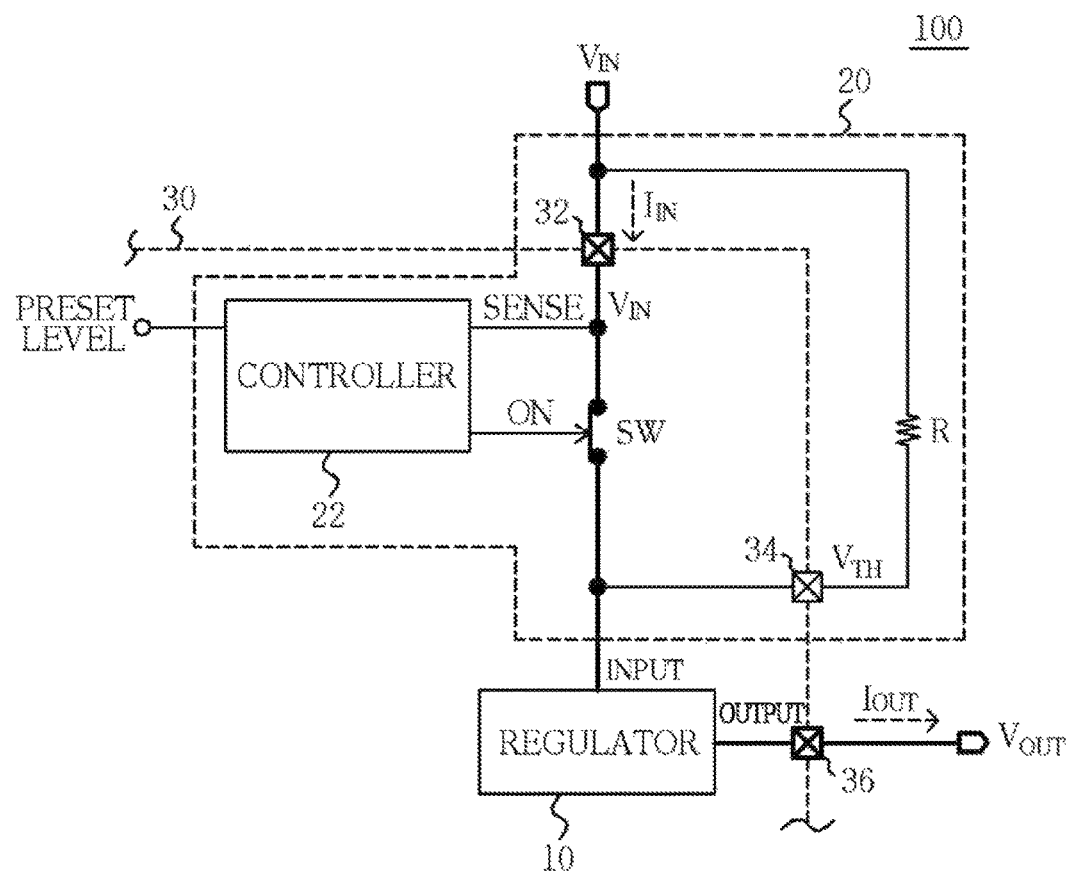
FIGS. 1 and 2 are diagrams illustrating a heat dissipation circuit and a regulator control circuit including the same in accordance with an embodiment.

Hereinafter, embodiments of the present disclosure will be described in detail with reference to the accompanying drawings. The terms used herein and in the claims shall not be construed by being limited to general or dictionary meanings and shall be interpreted based on the meanings and concepts corresponding to technical aspects of the present disclosure.

Embodiments described herein and configurations illustrated in the drawings are preferred embodiments of the present disclosure, and, because they do not represent all of the technical features of the present disclosure, there may be various equivalents and modifications that can be made thereto at the time of the present application.

Embodiments of the present disclosure intend to decrease a voltage applied to a regulator and thereby reduce internal heat generation so as to reduce the power consumption of the regulator which provides a stable output voltage to a load.

Figure 2:
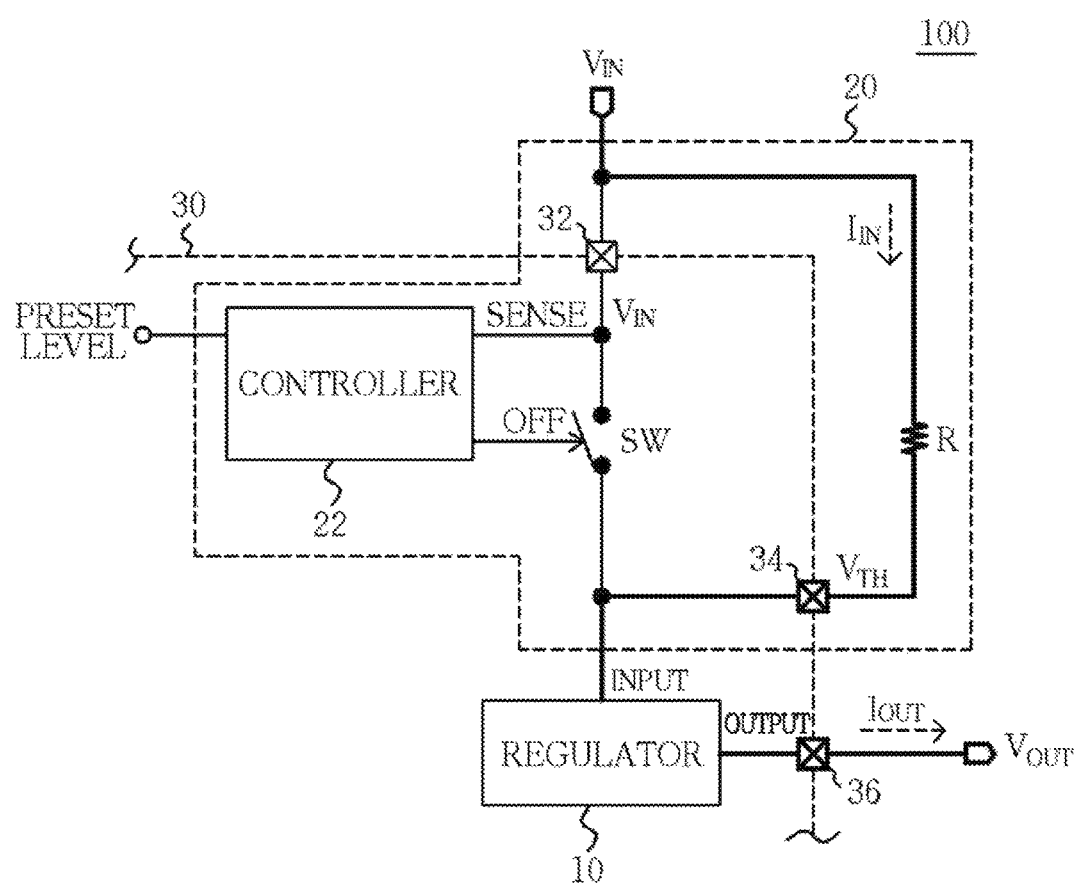

FIGS. 1 and 2 are diagrams illustrating a heat dissipation circuit and a regulator control circuit including the same in accordance with an embodiment. FIG. 1 shows a current path corresponding to the case where an input voltage VIN is sensed to be lower than a preset level, and FIG. 2 shows a current path corresponding to the case where the input voltage VIN is sensed to be equal to or higher than the preset level.

Referring to FIGS. 1 and 2, a regulator control circuit 100 in accordance with an embodiment includes a regulator 10 and a heat dissipation circuit 20.

The regulator 10 regulates an output current IOUT in correspondence to the input voltage VIN and thereby provides a stable output voltage VOUT to a load such as a lighting device. For instance, the regulator 10 may include a sensing resistor for sensing the output voltage, a comparator which compares a sensing voltage by the sensing resistor and a preset reference voltage and outputs a control signal for regulation depending on a comparison result, and a transistor which regulates the output current IOUT in correspondence to the control signal of the comparator.

In such a regulator 10, if the input voltage VIN increases, as the power consumed in the regulator increases, heat generation may become serious. In the present embodiment, in order to reduce the power consumed inside the regulator 10, a dropped input voltage VTH which is dropped outside the regulator 10 is provided to the regulator 10.

The regulator 10 receives the input voltage VIN or the dropped input voltage VTH according to the control of the heat dissipation circuit 20, regulates the output current IOUT in correspondence to the input voltage VIN or the dropped input voltage VTH, and provides the stable output voltage VOUT of a target level to the load such as a lighting device.

The heat dissipation circuit 20 senses a change in the input voltage VIN, controls the input voltage VIN to be transferred to the regulator 10 when the input voltage VIN is sensed to be lower than the preset level, and controls the dropped input voltage VTH to be transferred to the regulator 10 when the input voltage VIN is sensed to be equal to or higher than the preset level, so as to dissipate the heat of the regulator 10 from an exterior.

Such a heat dissipation circuit 20 may include a switch SW, a resistor R and a controller 22.

The switch SW transfers the input voltage VIN to the regulator 10 when it is turned on, and the resistor R transfers the dropped input voltage VTH to the regulator 10 when the switch SW is turned off. The switch SW is turned on in the case where the input voltage VIN is sensed to be lower than the preset level and is turned off in the case where the input voltage VIN is sensed to be equal to or higher than the preset level.

The controller 22 senses the level of the input voltage VIN, and turns on the switch SW in the case where the input voltage VIN is sensed to be lower than the preset level such that the input voltage VIN is transferred to the regulator 10 through the current path by the switch SW.

Further, the controller 22 turns off the switch SW in the case where the input voltage VIN is sensed to be equal to or higher than the preset level such that the dropped input voltage VTH is transferred to the regulator 10 through the current path by the resistor R.

For instance, the controller 22 may include a sensing section (not shown) for sensing a change in the input voltage VIN and a control logic section (not shown) for controlling the turn-on or turn-off of the switch SW depending on whether the input voltage VIN sensed by the sensing section is sensed to be lower than or equal to or higher than the preset level.

At least one of the switch SW, the controller 22 and the regulator 10 may be integrated into a chip 30, and the resistor R may be disposed outside the chip 30.

The chip 30 may include a first input terminal 32 for receiving the input voltage VIN, a second input terminal 34 for receiving the dropped input voltage VTH through the resistor R and an output terminal 36 which provides the output voltage VOUT having the target level by the regulator 10, to the load such as a lighting device. The first input terminal 32 is disposed between the terminal of the input voltage VIN and the switch SW, and the second input terminal 34 is disposed between the resistor R and the regulator 10.

Figure 3:
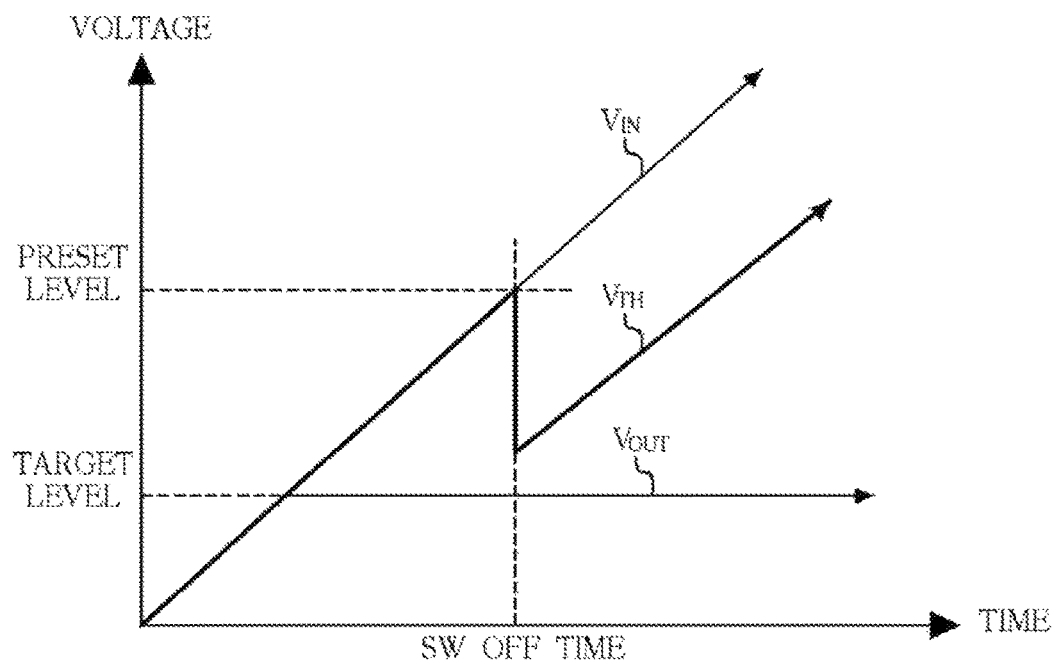
FIG. 3 is a graph for explaining the operation of a heat dissipation circuit in accordance with an embodiment.

FIG. 3 is a graph for explaining the operation of a heat dissipation circuit in accordance with an embodiment.

Referring to FIGS. 1 and 3, the heat dissipation circuit 20 turns on the switch SW in the case where the input voltage VIN is sensed to be lower than the preset level such that the input voltage VIN is transferred to the regulator 10 through the current path by the switch SW.

The regulator 10 may regulate the output current IOUT in correspondence to the input voltage VIN and provide the output voltage VOUT of the target level to the load such as a lighting device.

Further, referring to FIGS. 2 and 3, the heat dissipation circuit 20 turns off the switch SW in the case where the input voltage VIN is sensed to be equal to or higher than the preset level such that the dropped input voltage VTH is transferred to the regulator 10 through the current path by the resistor R.

The regulator 10 may regulate the output current IOUT in correspondence to the dropped input voltage VTH and provide the output voltage VOUT of the target level to the load such as a lighting device. Since only a current path is changed from the switch SW to the resistor R, overall power consumption does not change.

Since the regulator 10 regulates a current in correspondence to the input voltage VTH dropped in the heat dissipation circuit 20, even in the case where the input voltage VIN rises to be equal to or higher than the preset level, the power consumed inside the regulator 10 may be reduced, whereby internal heat generation may be reduced. That is to say, since the power consumption of the regulator 10 is decreased by the power consumed in the resistor R, heat generation is reduced resultantly.

While it is illustrated that the embodiments are applied to the regulator 10 in which heat generation becomes serious in the case where an input voltage increases, it is to be noted that the embodiments may be applied to other internal circuits in which power consumption is substantial and thus heat dissipation is required.

Moreover, while the embodiments illustrate that the resistor R is used to consume power outside a chip, it is to be noted that the embodiments are not limited thereto and replacement may be made to at least one of other elements and circuits for consuming power outside a chip.

As is apparent from the above descriptions, according to the embodiments of the present disclosure, since a dropped input voltage is provided to a regulator through a resistor disposed outside a chip in the case where an input voltage is sensed to be equal to or higher than a preset level, heat may be dissipated through the resistor disposed outside the chip, whereby it is possible to reduce the internal heat generation of the regulator.

While various embodiments have been described above, it will be understood to those skilled in the art that the embodiments described are by way of example only. Accordingly, the disclosure described herein should not be limited based on the described embodiments.

What is claimed is:

1. A regulator control circuit comprising:
   a heat dissipation circuit configured to sense a change in an input voltage, and provide a dropped input voltage when the input voltage is sensed to be equal to or higher than a preset level; and
   a regulator configured to provide an output voltage by regulation using one of the input voltage and the dropped input voltage, to a load,
   wherein the heat dissipation circuit comprises:
      a switch configured to transfer the input voltage to the regulator and turn off when the input voltage rises to be equal to or higher than the preset level;
      a resistor configured to drop the input voltage and transfer the dropped input voltage to the regulator when the switch is turned off; and
      a controller configured to sense a change in the input voltage being input to the regulator by the switch by comparing the input voltage with the preset level, and control the switch to be turned off when the input voltage rises to be equal to or higher than the preset level such that the dropped input voltage is transferred to the regulator by the resistor,
   wherein the controller, the switch and the regulator are integrated into a chip, and the resistor is disposed outside the chip.

2. The regulator control circuit of claim 1, wherein the heat dissipation circuit is configured to provide the input voltage to the regulator when the input voltage is sensed to be lower than the preset level.

3. The regulator control circuit of claim 1, wherein the resistor is configured to transfer the dropped input voltage to the regulator such that heat is dissipated outside the regulator.

4. The regulator control circuit of claim 1, wherein the controller is configured to turn off the switch when the input voltage is sensed to be equal to or higher than the preset level, and turn on the switch when the input voltage is sensed to be lower than the preset level.

5. The regulator control circuit of claim 1,
   wherein the chip comprises:

a first input terminal configured to receive the input voltage;

a second input terminal configured to receive the dropped input voltage; and an output terminal configured to output the output voltage to the load.

6. A heat dissipation circuit comprising:

a switch configured to transfer an input voltage to a regulator and turn off when the input voltage rises to be equal to or higher than a preset level;

a resistor configured to drop the input voltage and transfer a dropped input voltage to the regulator when the switch is turned off; and a controller configured to sense a change in the input voltage being input to the regulator by the switch by comparing the input voltage with the preset level, and control the switch to be turned off when the input voltage rises to be equal to or higher than the preset level such that the dropped input voltage is transferred to the regulator by the resistor, wherein the controller, the switch and the regulator are integrated into a chip, and the resistor is disposed outside the chip.

7. The heat dissipation circuit of claim 6, wherein the controller is configured to turn off the switch when the input voltage is sensed to be equal to or higher than the preset level such that the dropped input voltage is transferred to the regulator by the resistor.

8. The heat dissipation circuit of claim 7, wherein the controller is configured to turn on the switch when the input voltage is sensed to be lower than the preset level such that the input voltage is transferred to the regulator by the switch.

9. The heat dissipation circuit of claim 6, wherein the regulator is configured to regulate an output current in correspondence to the input voltage or the dropped input voltage provided according to switch control of the controller, and provide an output voltage of a target level to a load.

10. The heat dissipation circuit of claim 9, wherein the chip comprises:

a first input terminal configured to receive the input voltage;

a second input terminal configured to receive the dropped input voltage; and an output terminal configured to output the output voltage to the load.

11. A regulator control circuit comprising:

a first input terminal configured to receive an input voltage;

a second input terminal configured to receive a dropped input voltage;

a regulator configured to provide an output voltage by regulation using one of the input voltage and the dropped input voltage, to a load;

a switch configured to transfer the input voltage being received through the first input terminal to the regulator and turn off when the input voltage rises to be equal to or higher than a preset level;

a resistor configured to drop the input voltage and transfer the dropped input voltage through the second input terminal to the regulator when the switch is turned off;

a controller configured to sense a level of the input voltage being input to the regulator by the switch by comparing the input voltage with the preset level, and control the switch to be turned off when the input voltage rises to be equal to or higher than the preset level such that the dropped input voltage is transferred to the regulator through the second input terminal by the resistor.

* * * * *